(12) United States Patent  
Stamps et al.

(10) Patent No.: US 8,038,539 B2  
(45) Date of Patent: Oct. 18, 2011

(54) CONSTANT-VELOCITY JOINT WITH TORQUE-COMBINING DIFFERENTIAL

(75) Inventors: Frank B. Stamps, Colleyville, TX (US); Patrick R. Tisdale, Roanoke, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 12/808,234

(22) PCT Filed: Jan. 4, 2008

(86) PCT No.: PCT/US2008/050213  
§ 371 (c)(1), (2), (4) Date: Jun. 15, 2010

(87) PCT Pub. No.: WO2009/088495  
PCT Pub. Date: Jul. 16, 2009

(65) Prior Publication Data  
US 2010/0266411 A1     Oct. 21, 2010

(51) Int. Cl.  
*F16D 3/48* (2006.01)

(52) U.S. Cl. ........................ 464/138; 464/904

(58) Field of Classification Search ............. 464/138, 464/904, 905; 416/134 A, 151; 244/17.11, 244/60  
See application file for complete search history.

(56) References Cited

U.S. PATENT DOCUMENTS

| 784,397 | A | * | 3/1905 | Halle ................ 464/138 X |
|---|---|---|---|---|
| 4,729,753 | A | | 3/1988 | Neathery et al. |
| 5,145,321 | A | | 9/1992 | Flux et al. |
| 6,695,254 | B2 | | 2/2004 | Zoppitelli et al. |
| 6,712,313 | B2 | | 3/2004 | Zoppitelli et al. |

OTHER PUBLICATIONS

International Search Report and Written Opinion in PCT/US08/50213, mailed Jul. 1, 2008.  
International Preliminary Report on Patentability in PCT/US08/50213, mailed Oct. 28, 2010.

* cited by examiner

*Primary Examiner* — Gregory Binda  
(74) *Attorney, Agent, or Firm* — James E. Walton; Noah A. Tevis

(57) ABSTRACT

A constant-velocity drive system for an aircraft rotor has a gimbal mechanism and a differential torque-combining mechanism. The gimbal mechanism has gimbals driven in rotation by a rotor mast about a mast axis, the gimbals providing for gimballing relative to the mast about gimbal axes generally perpendicular to the mast axis. The differential torque-combining mechanism is connected to the gimbal mechanism and configured to be driven in rotation about the mast axis by the gimbal mechanism. The differential mechanism is capable of gimballing relative to the mast about the gimbal axes, the differential torque-combining mechanism having an output component attached to a yoke of the rotor for driving the yoke in rotation with the differential torque-combining mechanism.

9 Claims, 12 Drawing Sheets

CONSTANT-VELOCITY JOINT WITH TORQUE-COMBINING DIFFERENTIAL

TECHNICAL FIELD

The technical field is coupling systems for rotary-wing aircraft.

DESCRIPTION OF THE PRIOR ART

Consumer demand is increasing for rotary-wing aircraft to provide more thrust, higher speeds, and carry heavier loads and/or heavier fuselages. For example, there is a demand for more powerful tiltrotor aircraft. Of course, where performance criteria such as those listed above are to be increased, the functional systems of the rotary-wing aircraft must be improved to provide the desired resultant performance enhancements. The rotor hub drive system is one of the many functional systems which requires improvement in order to meet the demand for improved rotary-wing aircraft performance.

Rotor hub drive systems often include constant-velocity drive systems, or homokinetic drive systems, which have been in use for a very long time. There are numerous successful designs of constant-velocity drive systems for various types of rotary-wing aircraft. Constant-velocity drive systems are typically designed for transferring torque, or rotational force, from a first rotating member to a second rotating member, where the first rotating member may not be coaxial with the second rotating member. Constant-velocity drive systems are particularly well suited for use in rotary-wing aircraft as a means of transferring torque from a rotating mast to a rotor hub, especially where the rotor hub is gimbaled to the rotating mast. Two such constant-velocity drive systems are taught by Zoppitelli et al. in U.S. Pat. No. 6,712,313.

Zoppitelli et al. teaches a first constant-velocity drive system where a torque-splitting mechanism (see Zoppitelli et al. FIGS. 2-6) is associated with a two-gimbal device (see Zoppitelli et al. FIGS. 7 and 8) for driving in rotation and tilting (with respect to a mast) a rotor hub. Zoppitelli et al. also teach a second constant-velocity drive system where the same torque-splitting mechanism drives a rotor hub in rotation via drive links and where the rotor hub is gimbaled to the mast by a gimbal means comprising half of a flapping thrust bearing (see Zoppitelli et al. FIGS. 9 and 10). In the second constant-velocity drive system, the differential mechanism drives the hub in rotation via drive links while the hub is connected to the mast with a tilting means comprising a flapping thrust bearing.

Referring now to FIG. 1, a tiltrotor, rotary-wing aircraft incorporating a constant-velocity drive system as taught by Zoppitelli et al. is illustrated. Tiltrotor aircraft 17 is shown in an airplane mode of flight operation. When aircraft 17 is in an airplane mode, wings 19 (only one shown) are utilized to lift fuselage 21 in response to the action of rotor systems 23 (only one shown). Rotor-blades of rotor systems 23 are not shown. Two nacelles 25 (only one shown) each substantially enclose a constant-velocity drive system 27, obscuring constant-velocity drive system 27 from view in FIG. 1. Of course, each rotor system 21 is driven by associated engines (not shown), one engine housed within each nacelle 25.

Referring now to FIGS. 2-6, Zoppitelli et al. teach a differential torque-splitting mechanism fitted to a rotor mast, for driving in rotation the hub of a convertible aircraft tilting rotor, as described above with reference to FIG. 1.

In FIGS. 2-6, mast 29 of the rotor, driven by its base (not shown) in rotation about its longitudinal axis Z-Z, supports, a differential mechanism, designated as a whole by number 31. This mechanism 31, which belongs to the means for constant-velocity drive of the rotor hub, mainly comprises an assembly of three discs coaxial about the axis Z-Z and placed one on top of the other along this axis, a central disc 33 of which is arranged axially between the other two discs 35 and 37, one of which, arranged axially between central disc 33 and a seating shoulder 39, annular, peripheral and projecting radially toward the outside on shaft or mast 29, is termed an inner disc 35, as it is arranged along the axis Z-Z at the base end of mast 29, and therefore toward the inside of the convertible aircraft structure, while third disc 37, termed the outer disc, is arranged axially between central disc 33 and an axial preload device 41, fitted along a threaded portion of mast 29, to provide axial stacking (along Z-Z) of the three discs 33, 35 and 37 of the assembly with preloading, under the conditions and for the reasons which are explained below.

Central disc 33 is made integral in rotation with mast 29 by internal axial splines 43 in its central bore, which are engaged with external axial splines on a cylindrical splined portion 29a of mast 29, to transmit the torque. As can also be seen in FIG. 7, central disc 33 has a central portion 45, between two cylindrical journals 47 and 49 at the axial ends, which is extended radially toward the outside by four spider arms 51 each drilled with two cylindrical bores 55 side by side and with parallel axes. The four spider arms 51 are diametrically opposite in twos, and regularly distributed over the periphery of central portion 45 of central disc 33.

Each of the inner 35 and outer 37 discs comprises a peripheral portion respectively 57 and 59, which is offset axially toward central portion 45 of central disc 33 and surrounds inner axial journal 47 (the lower one in the drawings) or respectively outer axial journal 49 (the upper one in the drawings) of the latter, and each of the peripheral portions 57 and 59 respectively of inner disc 35 and of outer disc 37 also has, projecting radially toward the outside, four spider arms respectively 61 and 63, also diametrically opposite in twos and regularly distributed over the periphery of said peripheral portions 57 and 59, and each also drilled with two bores respectively 65 and 67 side by side and with parallel axes, and of the generally the same diameter as bores 55 in central disc 33.

Moreover, inner disc 35 supports two drive pins 69, of generally cylindrical shape with a circular cross-section, with axes contained within a radial (relative to the axis Z-Z) plane, and which project toward the outside of the inner disc and occupy diametrically opposite positions, each being between two spider arms 61 of disc 35, and at the same time offset axially toward central portion 45 of central disc 33, so that they can be housed in one of the cut-away portions, delimited at the periphery of this central portion 45 of central disc 33, between two spider arms 51 of disc 33, (see FIGS. 5 and 6). Similarly, outer disc 37 has two drive pins 71, of the same cylindrical form with a circular cross-section and of the same size as pins 69 and also diametrically opposite and projecting toward the outside of peripheral portion 59 of disc 37, while being at the same time offset axially toward central portion 45 of central disc 33, so that they can each be housed in one of the four cut-away portions delimited by spider arms 51 on the periphery of central disc 33 and alternating in a circumferential direction about the axis common to these three discs 33, 35 and 37, with drive pins 69 of inner disc 35.

The three discs 33, 35 and 37 are placed one on top of the other axially so that at rest spider arms 51, 61 and 63 are directly above each other, and bores 55, 65 and 67 aligned between one disc and another, as shown in the left-hand half-view in FIG. 4, so that, in each of the eight groups of three bores 55, 65 and 67 aligned in this way, there can be housed one respectively of eight connecting pins 73, distributed in this way, over the periphery of the three discs, in four assemblies of two adjacent connecting pins 73, radially at the same distance from the axis Z-Z of mast 29, and distributed regularly in four pairs of connecting pins 73, diametrically opposite in twos and along two diametral planes perpendicular to each other, as shown in FIG. 2.

Each connecting pin 73 has its longitudinal geometrical axis A-A substantially parallel to the axis Z-Z of mast 29, and is hinged in each of the three corresponding spider arms 51, 61 and 63 by one respectively of three ball joint connections 75, 77 and 79 which are centered on the axis A-A. As shown in the right-hand half-view in FIG. 4, each connecting pin 73 is a pin with triple ball joints, with a central ball joint 81 with a larger diameter than that of two end ball joints 83, of the same diameter, each of ball joints 81 and 83 being a laminated ball joint retained radially (relative to the axis A-A) inside a cylindrical laminated bearing 85 (for the central ball joint connection 75) and 87 (for each of the end ball joint connections 77 and 79), cylindrical laminated bearings 85 and 87 being substantially coaxial about the geometrical axis A-A of corresponding connecting pin 73. For this reason, each connecting pin 73 is in the form, viewed from the outside, of a cylindrical sleeve divided axially into three parts placed one on top of the other and slightly spaced apart from each other, with a radial collar at the upper end (see FIG. 7) and each enclosing three ball joint connections 75, 77 and 79 offset along the axis A-A.

After the eight connecting pins 73 are installed, central disc 33, integral in rotation with mast 29, is a driving disc for inner disc 35 and outer disc 37, which are driven discs of mechanism 31, and each of which can drive in rotation, about the axis Z-Z, and by its two corresponding drive pins 69 or 71, at least one of driving devices connected to the hub to cause the latter to rotate, which are each hinged to the hub, so as to drive the latter in rotation, from the rotation of mast 29.

For the reasons explained below, in order to allow relative rotation, about the axis Z-Z of rotation of mast 29, between each of driven discs 35 and 37, on the one hand, and on the other, driving disc 33 and mast 29, each of driven discs 35 and 37 is mounted, in its portion which surrounds mast 29, axially between two radial annular bearings 89, surrounding mast 29 and substantially coaxial about the axis Z-Z of the latter. Thus the central portion of driven discs 35 is fitted between an inner radial bearing 89, seated against shoulder 39 of mast 29, and an outer radial bearing 89 seated against the inner axial end of journal 47 of driving disc 33, while the central portion of the other driven disc 37 is fitted between a radial bearing 89, seated against the outer end face of journal 49 of driving disc 33, and another radial bearing 89 with loads applied axially, in the direction which applies axial preloading to the stack of three discs 33, 35 and 37 and of four bearings 89, by axial preload device 41 which, in these drawings, is shown schematically as consisting of a nut 91 screwed around the externally threaded portion 29b of mast 29.

In addition to radial annular bearings 89, which may be plain but are preferably each a cylindrical laminated bearing, as shown, or possibly truncated cone-shaped, comprising at least one vulcanized elastomer washer between two metal washers, two axial bushings 93 are provided to facilitate relative rotation between each of driven discs 35 and 37, on the one hand, and on the other mast 29 and driving disc 33. One of two bushings 93 is fitted between peripheral portion 57 of driven disc 35 and journal 47 of driving disc 33, while the other axial bushing 93 is fitted between peripheral portion 59 of other driven disc 37 and other journal 49 of driving disc 33. These two axial bushings 93 are also substantially coaxial about the axis Z-Z of mast 29.

In FIGS. 2-6, differential mechanism 31 is such that two drive pins 69 of driven disc 35 are not only diametrically opposite relative to the axis Z-Z, but project radially toward the outside of driven disc 35, perpendicularly to the axis Z-Z, and coaxial about a first diametral axis X-X of mechanism 31 and of mast 29, so that pins 69 constitute a first diametral drive arm integral with driven disc 35. Similarly, the two drive pins 71 of driven disc 37, also diametrically opposite relative to the axis Z-Z and perpendicular to the latter, overhanging and projecting radially toward the outside of driven disc 37, and coaxial about a second diametral axis Y-Y of mechanism 31 and which at rest is perpendicular to the first diametral axis X-X and converging with the latter on the axis Z-Z, constitute a second diametral drive arm, integral in rotation with driven disc 37 and, when mechanism 31 is at rest, perpendicular to the first diametral drive arm formed by pins 69.

This differential mechanism 31 is compatible with a double-gimbal device 96, as shown in FIGS. 7 and 8, for a rotor in which this double-gimbal device 96 constitutes both the driving means and the tilting means placed between differential mechanism 31 on the one hand and, on the other, a rotor hub supporting blades, and which is thus mounted so as to pivot about any flapping axis intersecting the axis Z-Z of mast 29 and extending in any direction about this axis Z-Z, so that the hub, and therefore the rotor, can be driven in rotation about a geometrical axis inclined in any direction about the axis Z-Z of mast 29.

Referring now to FIGS. 7 and 8, double-gimbal device 96 comprises a first gimbal 97, substantially in the shape of an octagon (viewed in plan) mounted so as to pivot relative to mast 29 by two first bearings 101a, 101b which may be plain cylindrical bearings or, preferably, bearings consisting of cylindrical, conical, and/or where appropriate spherical laminated elements. A second gimbal 99, also substantially octagonal in shape, and arranged above first gimbal 97, is mounted so as to pivot in a similar manner by two second bearings such as 103a (the other one is not visible), of the same type as bearings 101a and 101b so that second gimbal 99 can pivot relative to mast 29.

The two gimbals 97 and 99 are thus each driven in rotation by one respectively of driven discs 35 and 37, themselves driven by mast 29 and driving disc 33, about the axis Z-Z of mast 29, while being mounted so as to pivot each about one respectively of the two axes, normally perpendicular, X-X and Y-Y.

In addition, the first gimbal 97 is hinged to a casing or hub body by two first ball joint connections such as 107a (see FIG. 8), preferably comprising laminated ball joints, each combined with a cylindrical or conical laminated bearing, and which are diametrically opposite relative to the axis Z-Z of mast 29, and each centered on the second diametral axis Y-Y, being retained in two small sleeves 105 coaxially about the axis Y-Y on gimbal 97, in the neutral or rest position of the rotor, the two first ball joint connections such as 107a remaining centered substantially in a diametral plane, defined by the axis Z-Z and by the second diametral axis Y-Y, when first gimbal 97 is pivoted about the first diametral axis X-X.

In a similar manner, second gimbal 99 is hinged to a hub body by two second ball joint connections 109a and 109b, also preferably comprising laminated ball joints combined with cylindrical or conical laminated bearings and, diametrically opposite relative to the axis Z-Z and each centered, at rest or in the neutral position of the rotor, on the first diametral axis X-X, while being retained in small sleeves 111 coaxial about the axis X-X on gimbal 99, these second ball joint connections 109*a* and 109*b* remaining substantially centered in a diametral plane defined by the axis Z-Z and the first diametral axis X-X when second gimbal 99 is pivoted about the second diametral axis Y-Y.

In this embodiment, a rotor hub is connected to mast 29 by two crossing gimbals 97 and 99, hinged to the inside of the hub by ball joint connections, preferably laminated such as 107*a* and 109*a*, 109*b*, and hinged so as to pivot about the two perpendicular diametral drive arms 69-69 and 71-71, at rest, by bearings 101*a*, 101*b* and such as 103*a*, according to an arrangement at the same time constituting a mechanism for tilting the hub and the blades, allowing pivoting of the hub as a whole about any flapping axis intersecting the axis Z-Z of mast 29 and running in any direction about the axis Z-Z, and a mechanism giving constant velocity drive of the hub and of the blades about a geometrical axis of rotation of the hub, which may be inclined in any direction about the axis Z-Z of mast 29 by causing gimbals 97 and 99 to pivot about their respective diametral axes X-X and Y-Y. The torque is transmitted between mast 29 and the hub by two transmission trains each comprising mast 29, the central disc 33, one respectively of the driven discs 35 and 37, and therefore gimbal 97 or 99 pivoting on driven disc 35 or 37, the corresponding two bearings 101*a*, 101*b* or such as 103*b*, the corresponding two ball joint connections such as 107*a* or 109*a*, 109*b* and the hub.

With a pivoting device of this type with two gimbals 97 and 99, it is known that tilting of the rotor disc and therefore of the hub relative to the axis Z-Z of mast 29 induces a cyclic relative rotation of these two gimbals 97 and 99, at a frequency of 2Ω (where is the frequency of rotation of the rotor), the two gimbals 97 and 99 performing rotation movements in opposite directions and of equal amplitude about the drive axis and in a plane perpendicular to this drive axis. The differential mechanism 31 compensates kinematically for this cyclic relative rotation of the two gimbals 97 and 99, by means of the connecting pins 73, linking driven discs 35 and 37 to driving disc 33, and which are inclined slightly while accompanying the rotation of driven discs 35 and 37 in opposite directions about the axis Z-Z of mast 29. At the same time, the static torque transmitted by mast 29 to two gimbals 97 and 99 is split by driving disc 33 between two driven discs 35 and 37, by means of connecting pins 73. This capability of the differential mechanism 31 to allow any relative movement of two gimbals 97 and 99 in the plane perpendicular to the drive axis eliminates the hyperstatic characteristics of a device in which the tilt mechanism with two gimbals would be directly connected to mast 29.

The constant velocity characteristics are thus obtained by the kinematic compatibility between the tilting and drive means using two gimbals 97 and 99, by means of differential mechanism 31.

Transmission of the loads from the rotor (lift and coplanar loads) to mast 29 is provided, from the hub to mast 29, via two gimbals 97 and 99 which, in opposite directions, transmit the torque from mast 29 to the hub. The radial annular bearings 89 and axial bushings 93, allowing relative rotation between driven discs 35 and 37 (connected to gimbals 97, 99) and driving disc 33 connected to mast 29, assist in transmitting the lift load and the coplanar loads, the lift also being transferred through the presence of axial preload device 41 with elastic deformation of the stack of three discs 33, 35 and 37 and of four annular radial bearings 89 against shoulder 39 on mast 29.

While the constant-velocity drive systems taught by Zoppitelli et al. may be suitable for smaller, lighter, less powerful rotary-wing aircraft, significant limitations become apparent when the constant-velocity drive systems taught by Zoppitelli et al. are considered for use in larger, heavier, more powerful rotary-wing aircraft. For example, in order to increase the torque transfer capability of a constant-velocity drive system taught by Zoppitelli et al., the overall size of the torque-splitting mechanism would necessarily increase. Additionally, since the two-gimbal device associated with the torque-splitting mechanism substantially envelopes the torque-splitting mechanism, the overall size of the two-gimbal device would also necessarily increase. It is desirable to configure the rotating components of rotor systems to remain as close to the axis of rotation of the mast as possible to minimize undesirable resultant forces. Clearly, increasing the size of the torque-splitting mechanism and the two-gimbal device taught by Zoppitelli et al. is not desirable and does not provide a satisfactory solution for providing a constant-velocity drive system for a larger, heavier, more powerful rotary-wing aircraft.

While the above described rotor hub advancements represent significant developments in rotor hub design, considerable shortcomings remain.

DESCRIPTION OF THE PREFERRED EMBODIMENT

An improved high-torque constant-velocity drive system for a rotary-wing aircraft has a torque-combining differential. While specific reference is made to using the drive system with tiltrotor aircraft, the drive system may alternatively be used with any other type of rotary-wing aircraft or in other applications.

Figure 1:
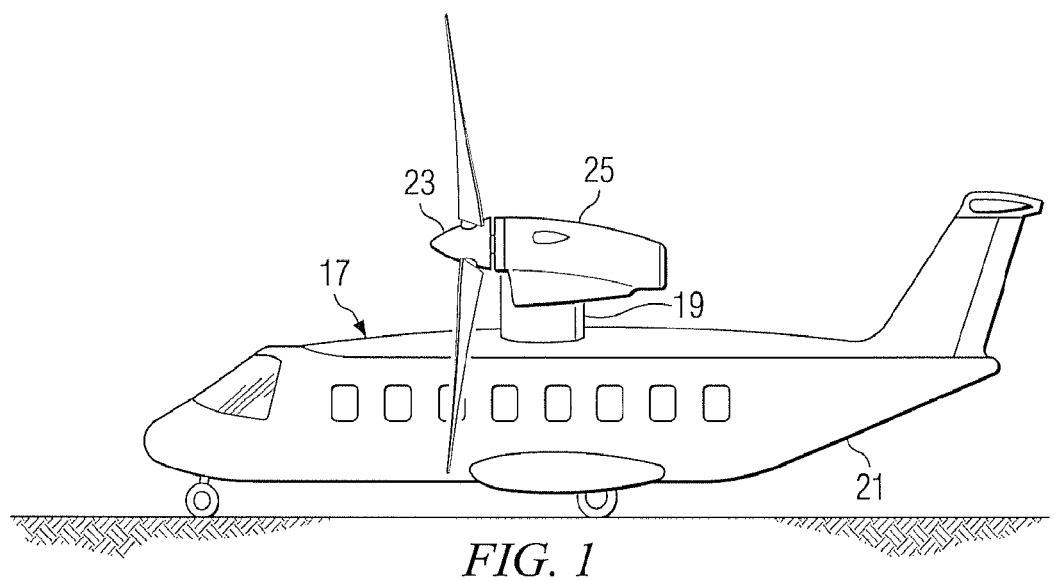
FIG. 1 is a side view of a prior art tiltrotor aircraft having a constant-velocity drive system as taught by Zoppitelli et al.
Figure 2:
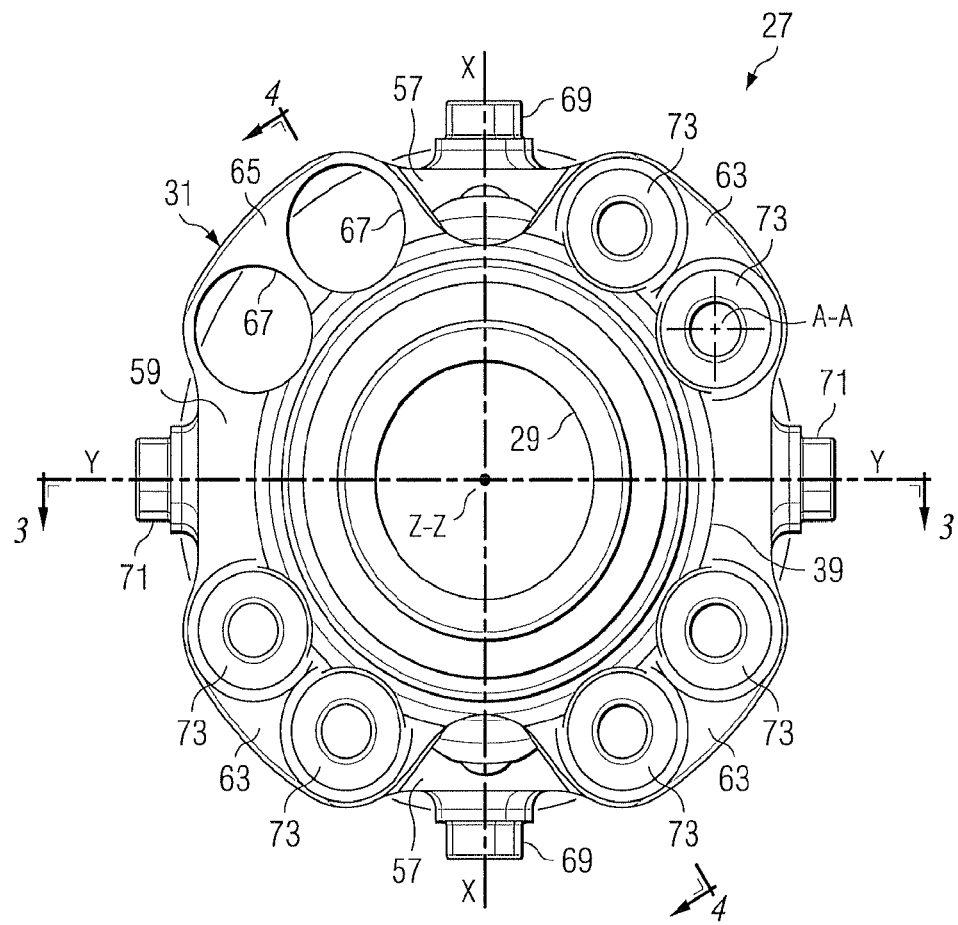
FIG. 2 is top view of a differential mechanism of the constant-velocity drive of FIG. 1.
Figure 3:
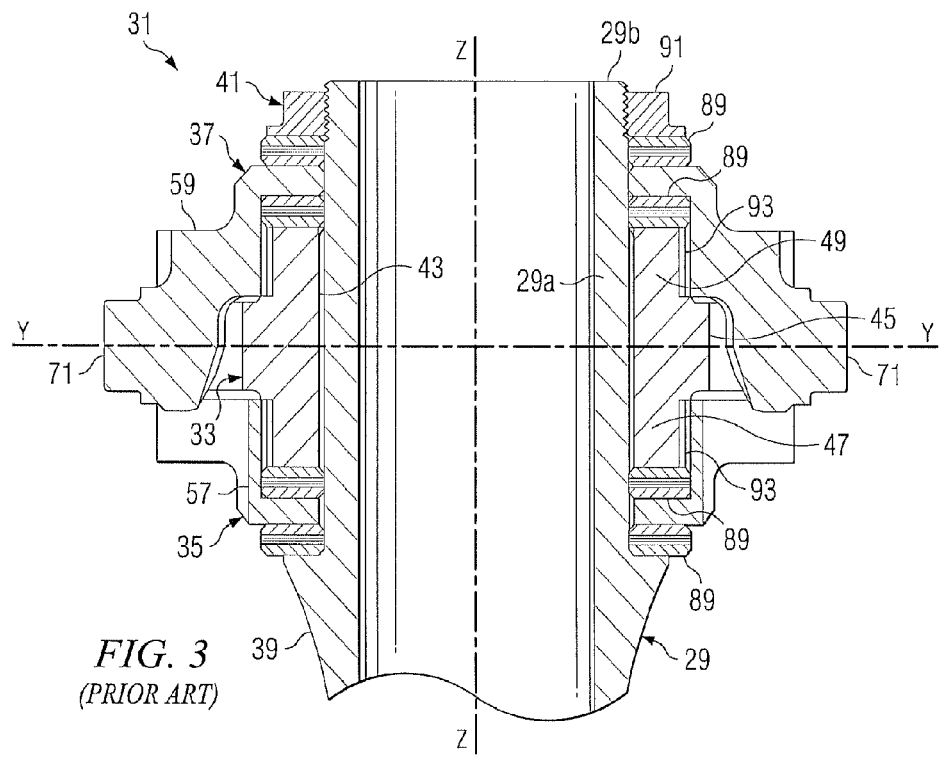
FIG. 3 is a cross-sectional view, taken at cutting line III of FIG. 2, of the differential mechanism of FIG. 2.
Figure 4:
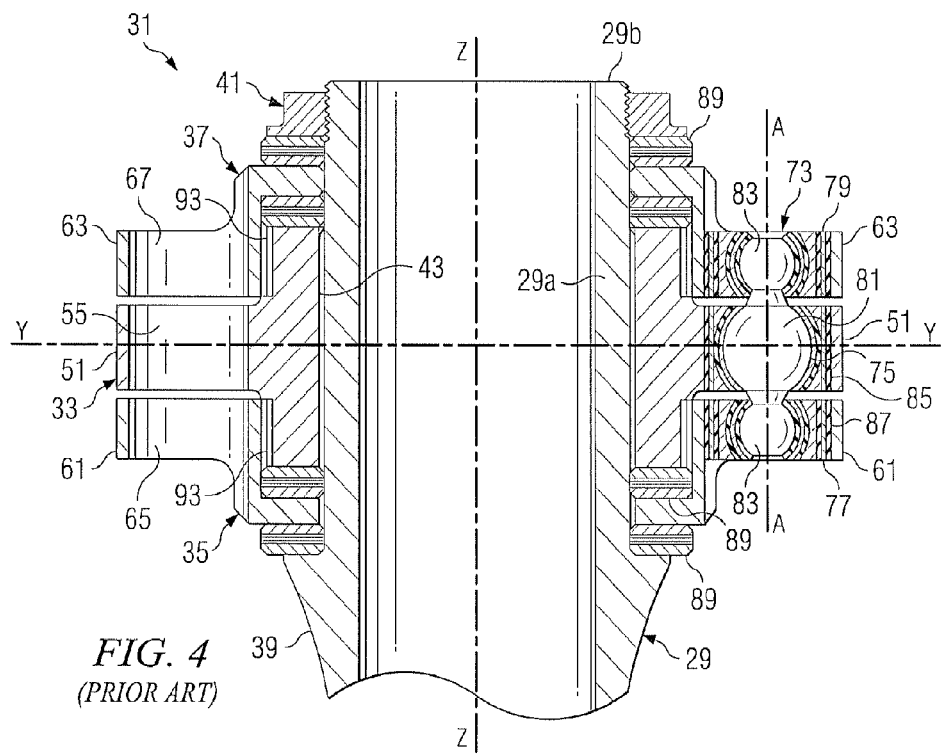
FIG. 4 is a cross-sectional view, taken generally near cutting line IV of FIG. 2, of the differential mechanism of FIG. 2.
Figure 5:
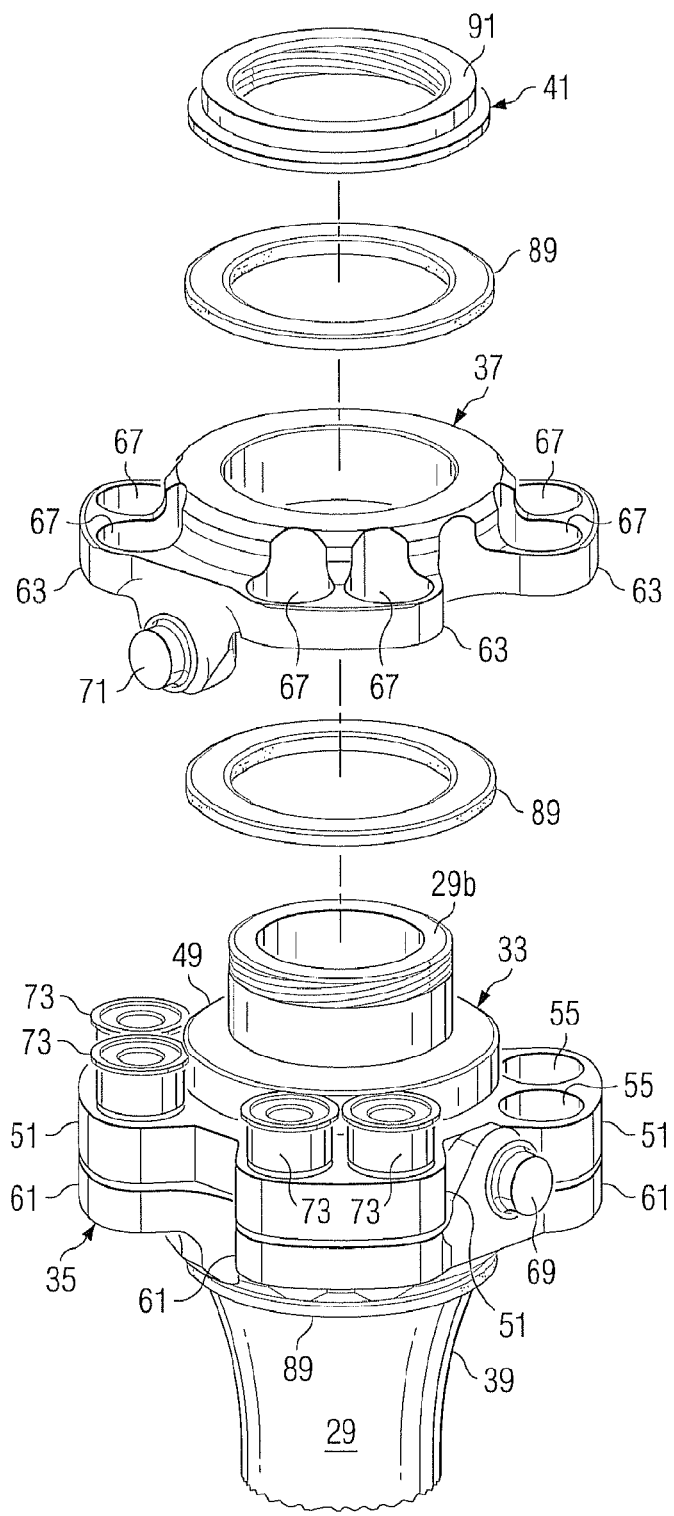
FIG. 5 is an exploded oblique view of the differential mechanism of FIG. 2.
Figure 6:
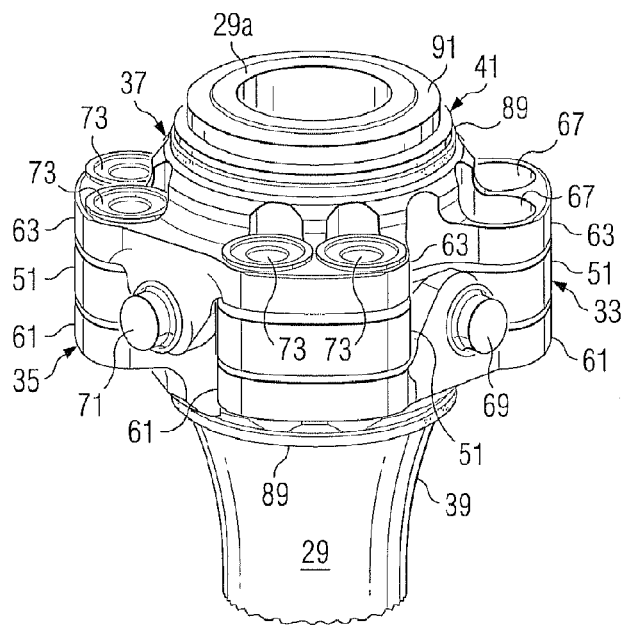
FIG. 6 is an oblique view of the differential mechanism of FIG. 2.
Figure 8:
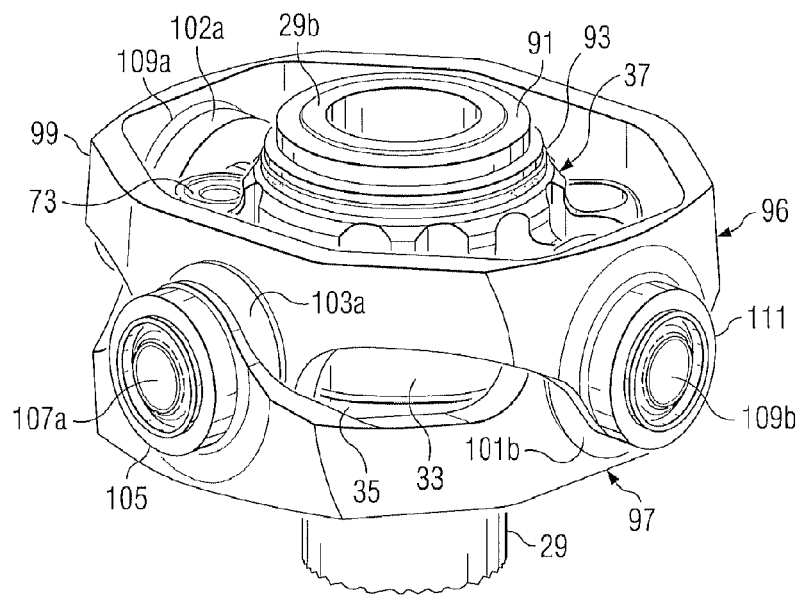
FIG. 8 is an oblique view of the differential mechanism and a double-gimbal device of the constant-velocity drive system of FIG. 1.
Figure 7:
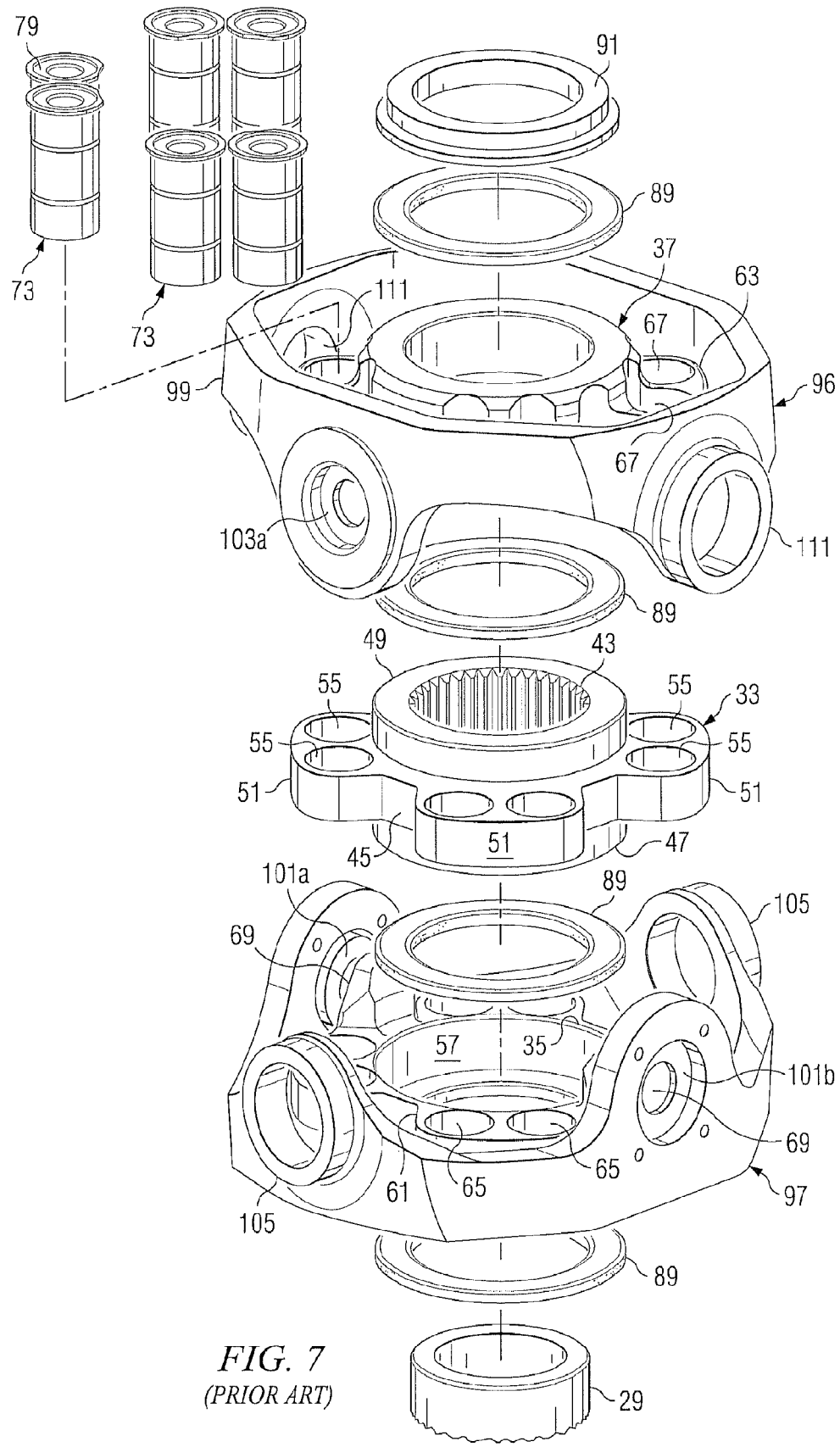
FIG. 7 is an exploded oblique view of the differential mechanism and a double-gimbal device of the constant-velocity drive system of FIG. 1.
Figure 9:
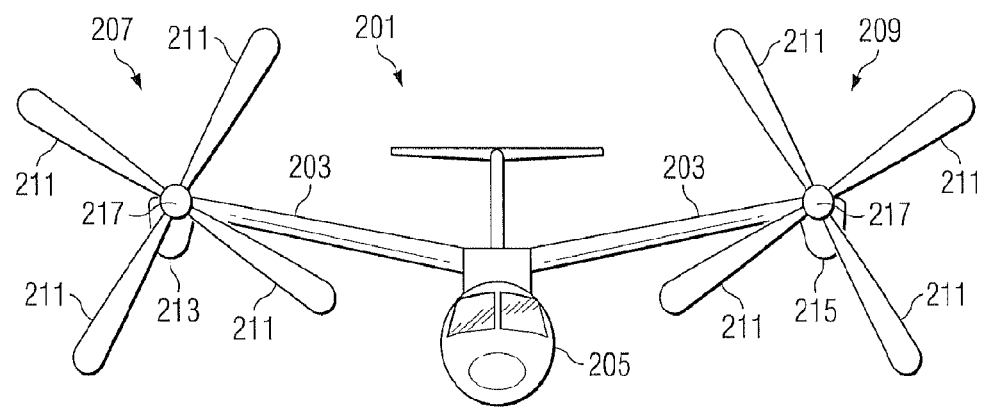
FIG. 9 is a front view of a tiltrotor aircraft having a constant-velocity drive system as described herein.

FIG. 9 illustrates a tiltrotor aircraft having four-blade rotors, each utilizing a constant-velocity drive system as described below. Tiltrotor aircraft 201 is shown in an airplane mode of flight operation, in which wings 203 are utilized to lift aircraft body 205 in forward flight. Aircraft 201 has two rotor systems 207, 209, and each rotor system 207, 209 has four blades 211 and is driven in rotation by engines (not shown) carried within nacelles 213, 215. A spinning cover 217 is mounted on a forward portion of each rotor system 207, 209, and each cover 217 substantially encloses a constant-velocity drive system, such as one of those described below, obscuring the constant-velocity drive systems from view in FIG. 9. Blades 211 are attached to a yoke of each rotor system 207, 209.

Figure 10:
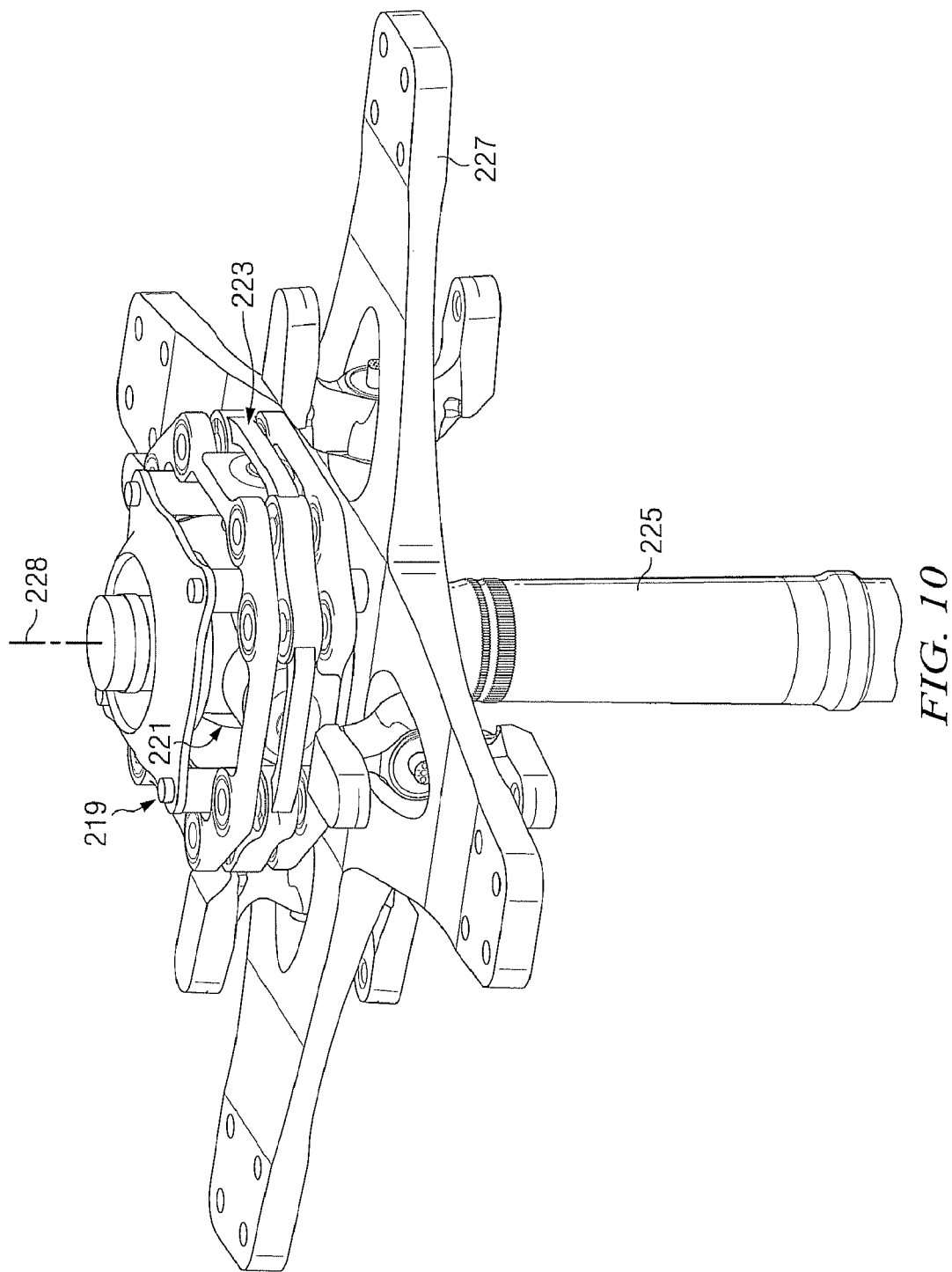
FIG. 10 is an oblique view of an embodiment of a constant-velocity drive system.
Figure 11:
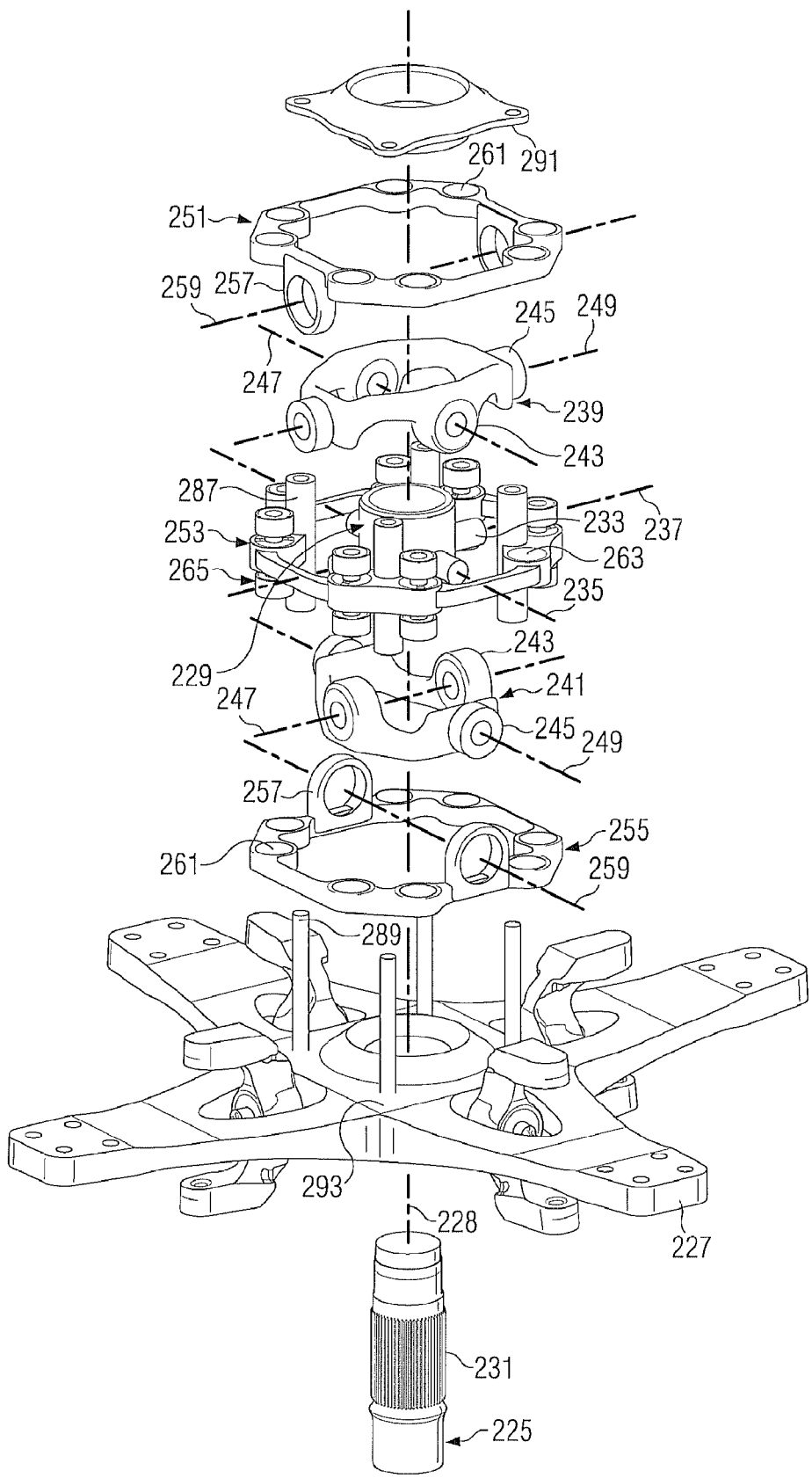
FIG. 11 is an exploded oblique view of the constant-velocity drive system of FIG. 10.

FIGS. 10 and 11 illustrate a portion of a rotor system, which may be rotor system 207 or 209, having a constant-velocity drive system 219. FIG. 10 is an oblique view showing system 219 as assembled, and FIG. 11 is an oblique view showing system 219 as exploded. Drive system 219 comprises a gimbal mechanism 221 and a torque-combining differential mechanism 223 and provides for the transfer of torque from rotor mast 225 to yoke 227 for driving yoke 227 in rotation with mast 225 about mast axis 228 while allowing yoke 227 to pivot relative to rotor mast 225 during flapping.

Referring now to FIG. 11, a trunnion carrier 229 is affixed to mast 225 with splines 231. Trunnion carrier 229 is preferably formed as a unitary piece and has two opposing pairs of trunnions 233 extending therefrom, the pairs of trunnions 233 defining perpendicular gimbal axes 235, 237. Gimbal mechanism 221 comprises first gimbal 239 and second gimbal 241, and gimbals 239, 241 are preferably identical in construction. Each gimbal 239, 241 comprises a pair of opposing inner bearings 243 and a pair of opposing outer bearings 245, such that each pair of inner bearings defines an axis 247 and each pair of outer bearings 245 defines an axis 249. Axes 247, 249 of each gimbal 239, 241 are perpendicular to each other. When assembled onto trunnion carrier 229, each inner bearing 243 engages one of trunnions 233, so that axis 247 of each gimbal is coaxial with one of axes 235, 237. This configuration allows each gimbal 239, 241 to pivot on its inner bearings 243 about one of axes 235, 237 and relative to trunnion carrier 229 and mast 225. It should be noted that inner bearings 243 and outer bearings 245 may be any appropriate type of bearing, such as cylindrical, ball, conical, and/or or laminated.

Torque-combining mechanism 223 comprises first ring 251, middle ring 253, and second ring 255. First ring 251 and second ring 255 are preferably identical in construction, and middle ring is located between rings 251, 255. Each of first ring 251 and second ring 255 comprises a pair of opposing bearing housings 257, and each pair of bearing housings 257 defines an axis 259. When each ring 251, 255 is assembled onto one of gimbals 239, 241, each bearing housing 257 engages one of outer bearings 245, so that axis 249 of each gimbal is coaxial with axis 259 of the associated ring 251, 255. This configuration allows each ring 251, 255 to pivot on outer bearings 245 about one of axes 249 and relative to gimbals 239, 241. Trunnion carrier 229, while shown within middle ring 253, is not directly attached to middle ring 253.

Each of first ring 251, middle ring 253, and second ring 255 has a plurality of cylindrical bores 261, 263 that extend in a direction generally parallel to mast axis 228. When assembled, bores 261, 263 on rings 251, 253, 255 are nominally coaxial and are connected using pin assemblies 265, which are shown as installed in bores 261 of middle ring 241.

Figure 12:
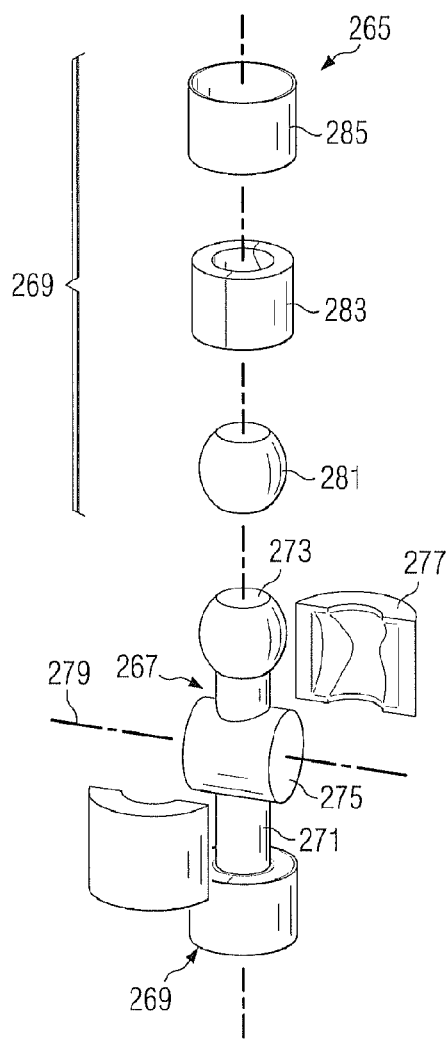
FIG. 12 is an exploded oblique view of a connecting pin assembly of FIG. 10.

FIG. 12 is an exploded view of a pin assembly 265, which comprises a pin 267 and pair of opposing ball joint assemblies 269. Pin 267 comprises a central shaft 271, two ball ends 273 at opposing ends of shaft 271, and a central cylindrical member 275. Cylindrical member 275 is carried within cylindrical bearing 277 (shown split in half in the figure), which is configured to be installed in one of bores 263 of middle ring 253. When assembled, axis 279 of each pin assembly is oriented to extend generally radially relative to mast axis 228, and this configuration allows for rotation of pin assembly 265 about axis 279 relative to middle ring 253. Each ball joint assembly 269 is configured to be installed in one of bores 261 of rings 251, 255 and comprises a spherical bearing 281, a cylindrical bearing 283, and a cylindrical sleeve 285. Each of ball ends 273 is a rigid ball end is retained within spherical bearing 281. Likewise, spherical bearing 281 is retained within cylindrical bearing 283, and cylindrical bearing 283 is retained within cylindrical sleeve 285. When installed, cylindrical sleeve 285 is mounted in one of bores 263 of rings 251, 255. The configuration of each ball joint assembly 269 allows pin assembly 265 to rotate about a focus at the center of each ball end 273 relative to rings 251, 255. The assembly of rings 251, 253, 255 and pin assemblies 265 allows for first ring 251 and second ring 255 to rotate in opposite directions relative to middle ring 253 while providing a constant torque path from gimbals 239, 241 to middle ring 253, which serves as the output component for mechanism 223. It should be noted that each of bearings 281, 283 are preferably laminated bearings, and that cylindrical member 275 may be configured in a different form, such as a ball joint, in alternate embodiments.

Referring again to FIG. 11, cylindrical barrels 287 are fixedly attached to middle ring 253 and extend in directions generally parallel to mast axis 228 when system 219 is in the nominal position. Barrels 287 are configured to fit over posts 289, which extend upward from yoke 227 between an upper hub spring 291 and a lower hub spring 293, and barrels 287 transfer torque from middle ting 253 to yoke 227 through posts 289. Posts 289 may be formed as components of lower hub spring 293, as shown, or posts may extend upward from yoke 227 and locate hub spring 291, 293 relative to yoke 227.

In operation, torque is transferred from mast 225 to trunnion carrier 229 through splines 231. Torque is then transferred from trunnions 233 to gimbals 239, 241 through inner bearings 243 and from gimbals 239, 241 to rings 251, 255 through outer bearings 245. Torque is then transferred from rings 251, 255 to middle ring 253 through pin assemblies 265 and from ring 253 to yoke 227 through barrels 287 and posts 289. The torque is transferred from mast 225 to yoke 227 even while allowing for yoke 227 to pivot relative to mast 225 about gimbal axes 235, 237.

Figure 13:
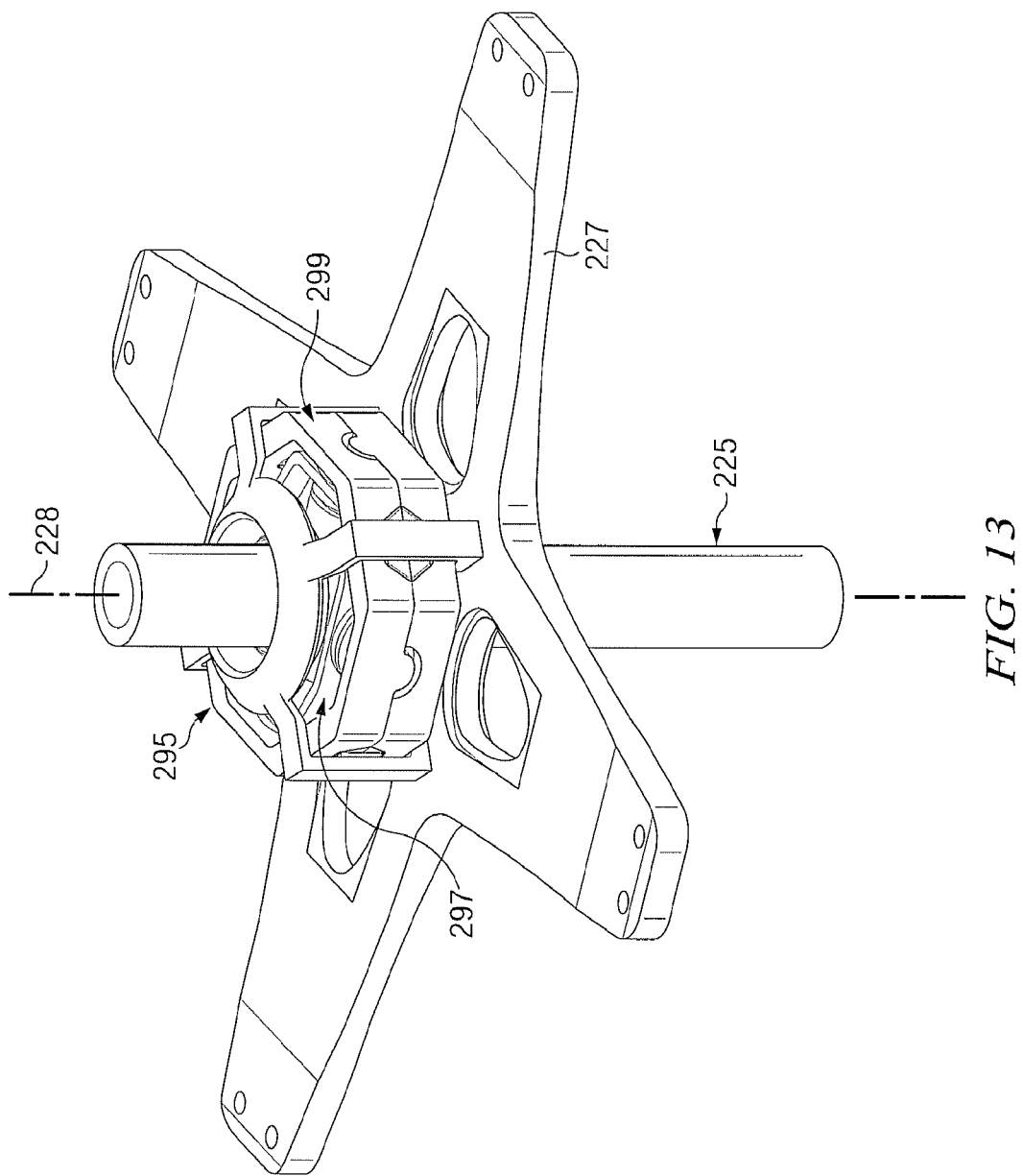
FIG. 13 is an oblique view of another embodiment of a constant-velocity drive system.
Figure 14:
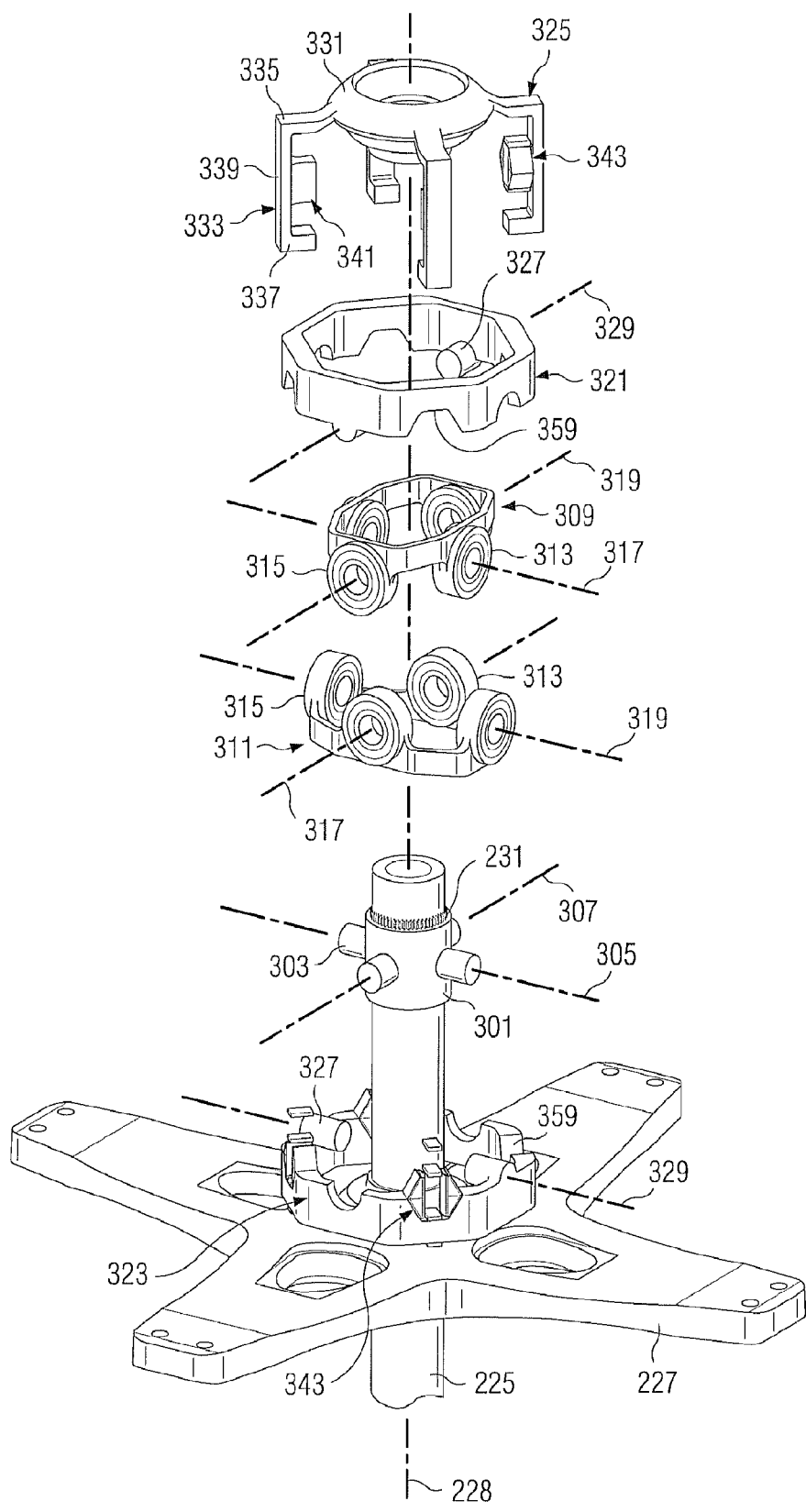
FIG. 14 is an exploded oblique view of the constant-velocity drive system of FIG. 13.

FIGS. 13 and 14 illustrate a portion of a rotor system, which may be rotor system 207 or 209, having a constant-velocity drive system 295. FIG. 13 is an oblique view showing system 295 as assembled, and FIG. 14 is an oblique view showing system 295 as exploded. Drive system 295 comprises a gimbal mechanism 297 and a torque-combining differential mechanism 299. Drive system 295 provides for the transfer of torque from rotor mast 225 to yoke 227 for driving yoke 227 in rotation with mast 225 about mast axis 228 while allowing yoke 227 to pivot relative to rotor mast 225 during flapping.

Referring to FIG. 14, trunnion carrier 301, which has a configuration similar to that of trunnion carrier 229, described above, is preferably formed as a unitary piece and is affixed to mast 225 with splines 231. Trunnion carrier 301 has two opposing pairs of trunnions 303 extending therefrom, the pairs of trunnions 303 defining perpendicular gimbal axes 305, 307. Gimbal mechanism 297 comprises first gimbal 309 and second gimbal 311, and gimbals 309, 311 are preferably identical in construction. Each gimbal 309, 311 comprises a pair of opposing inner bearings 313 and a pair of opposing outer bearings 315, such that each pair of inner bearings defines an axis 317 and each pair of outer bearings 315 defines an axis 319. Axes 317, 319 of each gimbal 309, 311 are perpendicular to each other. When assembled onto trunnion carrier 301, each inner bearing 313 engages one of trunnions 303, so that axis 317 of each gimbal is coaxial with one of axes 305, 307. This configuration allows each gimbal 309, 311 to pivot on its inner bearings 313 about one of axes 305, 307 and relative to trunnion carrier 301 and mast 225. It should be noted that inner bearings 313 and outer bearings 315 may be any appropriate type of bearing, such as cylindrical, ball, conical, and/or or laminated.

Torque-combining mechanism 299 comprises first ring 321, second ring 323, and cage 325. First ring 321 and second ring 323 are preferably identical in construction, and each ring 321, 323 comprises a pair of opposing trunnions 327 that define axes 329. When each ring 321, 323 is assembled onto one of gimbals 309, 311, each pair of trunnions 327 engages outer bearings 315 of one of rings 321, 323, so that axis 319 of each gimbal is coaxial with axis 329 of the associated ring 321, 323. This configuration allows each ring 321, 323 to pivot on outer bearings 315 about one of axes 319 and relative to gimbals 309, 311. It should be noted that second ring 323, while shown near yoke 227, is not directly attached to yoke 227.

Figure 15:
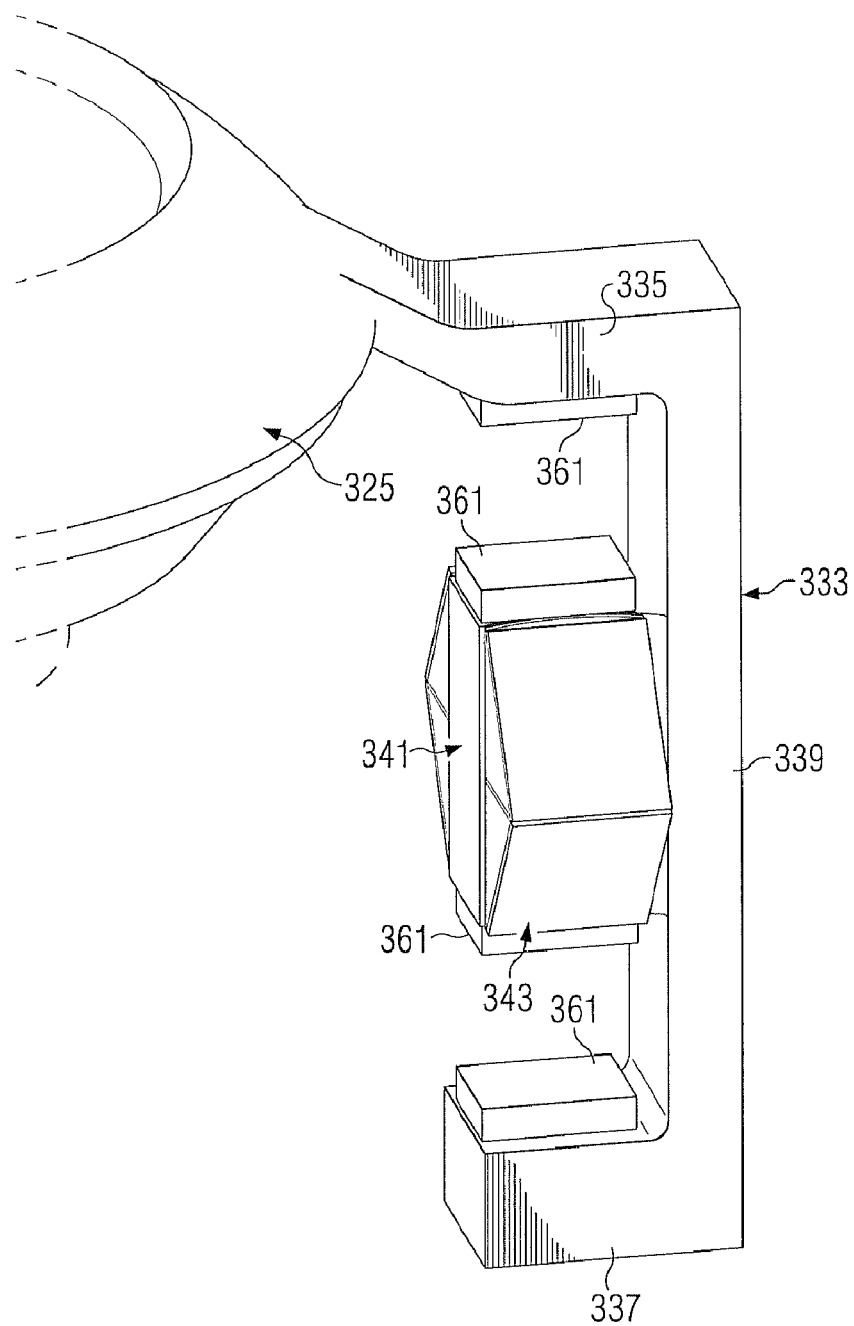
FIG. 15 is an oblique view of a portion of the drive system of FIG. 13.

In the present embodiment, torque is transferred from first ring 321 and second ring 323 to yoke 227 through cage 325, which serves as the output component for mechanism 299 and is attached directly to yoke 227. Cage 325 comprises a central hub spring 331 and four arms 333 extending therefrom and arrayed around hub spring 331. Referring also to FIG. 15, each arm 333 comprises upper endplate 335, lower endplate 337, and a bar 339 extending between endplates 335, 337. Each upper endplate 337 rigidly connects the associated bar 339 to hub spring 331, and each endplate 335, 337 extends generally perpendicularly to bar 339. A transfer block 341 extends inwardly from an inner surface of each bar 339. Wedge assemblies 343, which are detailed below, are located adjacent each transfer block 341 and are used to transfer forces from rings 321, 323 and through transfer blocks 341 into arms 333 of cage 325. Endplates 337 are rigidly fastened to yoke 227, which allows for torque from mast 225 to be transferred through trunnion carrier 301, into gimbal mechanism 297, then into torque-combining differential mechanism 299, and through cage 325 into yoke 227 for driving yoke 227 in rotation with mast 225.

Figure 16:
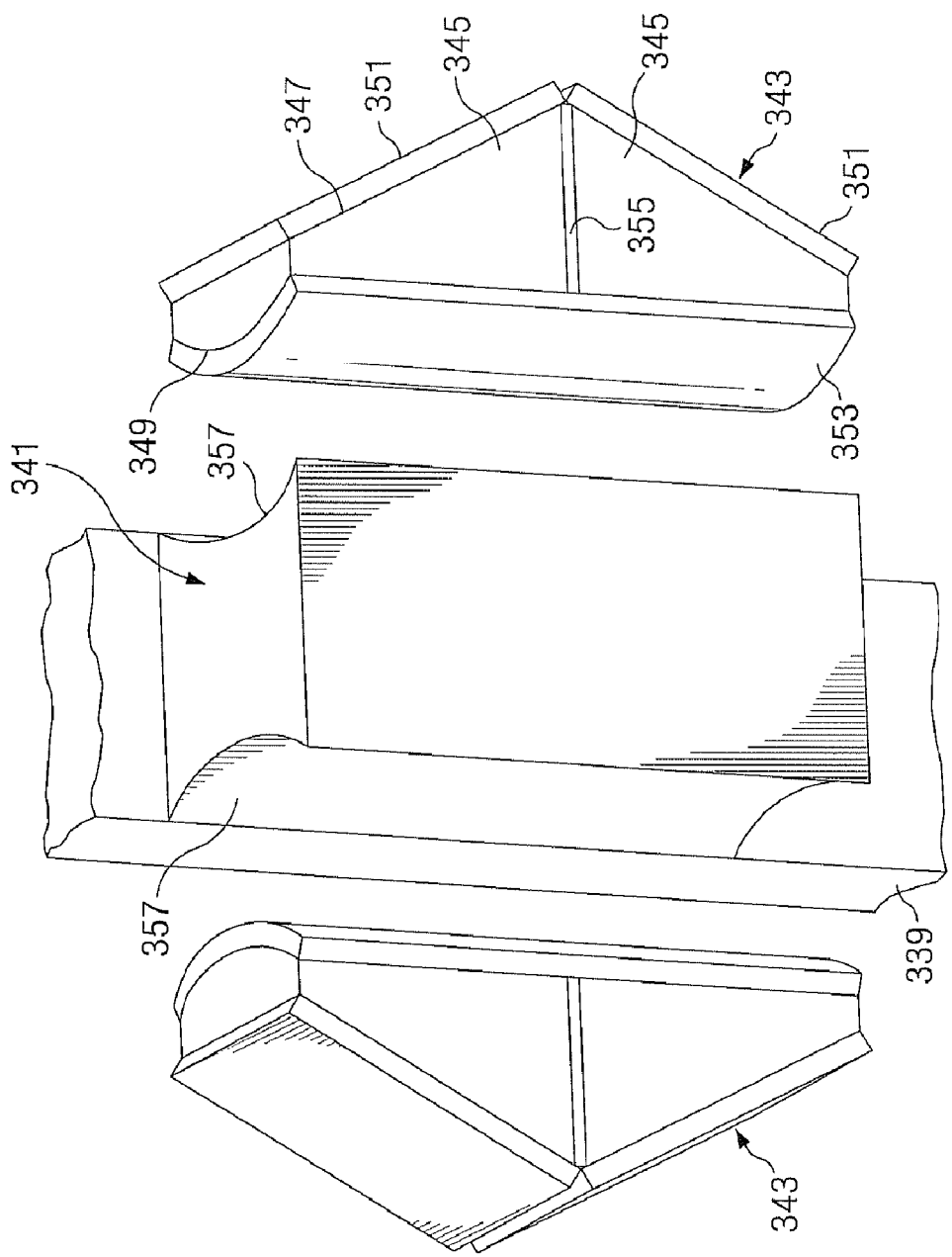
FIG. 16 is an exploded oblique view of a portion of the drive system of FIG. 13.

Referring to FIGS. 15 and 16, details of one of arms 333 and two wedge assemblies 343 are illustrated. Wedge assemblies 343 provide a similar function as pin assemblies 265, described above, in that wedge assemblies 343 allow for relative rotation of rings 321, 323 about mast axis 228 while forces are continuously transferred from rings 321, 323 into transfer block 341.

Each wedge assembly 343 comprises two wedges 345, with each wedge 345 having an inclined face 347 and a curved face 349. Pairs of wedges 345 are located on opposing sides of transfer block 341 and oriented so that their inclined faces form a "V" and their curved faces are aligned, as shown in the figures. To limit or prevent wear on faces 347, 349, bearings 351 are located adjacent faces 347, and curved bearings 353 are located adjacent faces 349. In addition, a bearing 355 is located between adjacent wedges 345. Bearings 351, 353, 355 are preferably elastomeric bearings, though any appropriate bearing may be used. As shown in the exploded view of FIG. 16, transfer block 341 has opposing curved faces 357, which are shaped to receive curved bearings 349 on wedges 345. The curvature allows for wedges 345 to rotate about an axis generally parallel to mast axis 228 while remaining in contact with faces 357 of contact block 341.

In order to transfer forces from ring 321, 323 to transfer blocks 341, each wedge assembly 343 engages trapezoidal notches 359 on rings 321, 323, as shown in FIG. 14. Upon assembly, notches 359 of each ring 321, 323 are nominally aligned with notches 359 of the other of rings 321, 323 to form hexagonal enclosures. The enclosures are sized to receive an upper or lower portion of transfer block 341 and the two adjacent wedges 345. This configuration provides for transfer of forces from each ring 321, 323 to transfer blocks 341 through pairs of wedges 345 and also allows for first ring 321 and second ring 323 to rotate in opposite directions relative to each other while providing a constant torque path from gimbals 309, 311 to cage. Additional bearings 361, which are preferably elastomeric, are located between rings 321, 323 are endplates 335, 337 and between notches 359 and the ends of transfer blocks 341.

In operation, torque is transferred from mast 225 to trunnion carrier 301 through splines 231. Torque is then transferred from trunnions 303 to gimbals 309, 311 through inner bearings 313 and from gimbals 309, 311 to rings 321, 323 through outer bearings 315. Torque is then transferred from rings 321, 323 to cage 325 through wedge assemblies 343, and from cage 325 to yoke 227 through endplates 337. The torque is transferred from mast 225 to yoke 227 even while allowing for yoke 227 to pivot about gimbal axes 305, 307 relative to mast 225.

This description includes reference to illustrative embodiments, but it is not intended to be construed in any limiting sense. Various modifications and combinations of the illustrative embodiments, as well as other embodiments, will be apparent to persons skilled in the art upon reference to this description.

What is claimed is:

1. A constant-velocity drive system for an aircraft rotor, the rotor being configured for rotation with a rotor mast, the constant-velocity drive system comprising:

a gimbal mechanism having a first gimbal and second gimbal, the first and second gimbals adapted to be driven in rotation by a rotor mast about a mast axis, the first and second gimbals providing for gimballing relative to the mast about gimbal axes generally perpendicular to the mast axis; and a differential torque-combining mechanism connected to the gimbal mechanism and configured to be driven in rotation about the mast axis by the gimbal mechanism, the differential torque-combining mechanism being capable of gimballing relative to the mast about the gimbal axes and having an middle ring adapted to be attached to a yoke of the rotor for driving the yoke in rotation with the differential torque-combining mechanism;

a trunnion carrier affixed to the rotor mast, the trunnion carrier having a plurality of trunnions extending radially, each trunnion aligning with one of the gimbal axes, the plurality of trunnions configured to engage the first and second gimbals.

2. The constant-velocity drive system according to claim 1, wherein the differential torque-combining mechanism comprises:

a first ring connected to the first gimbal;
a second ring connected to the second gimbal; and a plurality of pin assemblies connecting the first and second rings to the middle ring, the pin assemblies allowing for relative motion of the rings while providing for transfer of forces from the first and second rings to the middle ring.

3. The constant-velocity drive system according to claim 1, wherein the differential torque-combining mechanism comprises:
a first ring connected to the first gimbal;
a second ring connected to the second gimbal; and
a plurality of pin assemblies connecting the first and second rings to the middle ring, the pin assemblies each allowing for relative motion of the first and second rings while providing for transfer of forces from the first and second rings to the middle ring.

4. The constant-velocity drive system according to claim 1, wherein the differential torque-combining mechanism comprises:
a first ring connected to the first gimbal;
a second ring connected to the second gimbal; and
a plurality of pin assemblies connecting the first ring and second ring to the middle ring, the middle ring being located between the first and second rings, the pin assemblies allowing for relative motion of the first and second rings while providing for transfer of forces from the first and second rings to the middle ring.

5. A constant-velocity drive system for an aircraft rotor, the rotor being configured for rotation with a rotor mast, the constant-velocity drive system comprising:
a gimbal mechanism having a first gimbal and a second gimbal adapted to be driven in rotation by the rotor mast about a mast axis, the first and second gimbals providing for gimballing relative to the rotor mast about gimbal axes generally perpendicular to the mast axis;
a trunnion carrier affixed to the rotor mast, the trunnion carrier having a plurality of trunnions extending radially, each trunnion aligning with one of the gimbal axes, the plurality of trunnions configured to engage the gimbals; and
a differential torque-combining mechanism connected to the gimbal mechanism and configured to be driven in rotation about the mast axis by the gimbal mechanism and being capable of gimballing relative to the rotor mast about the gimbal axes, the differential torque-combining mechanism comprising:
a first ring connected to a first gimbal;
a second ring connected to a second gimbal,
a middle ring adapted to be attached to a yoke of the rotor for driving the yoke in rotation with the differential torque-combining mechanism; and
a plurality of pin assemblies connecting the first and second rings to the middle ring, the pin assemblies allowing for relative motion of the first and second rings while providing for transfer of forces from the first and second rings to the middle ring.

6. The constant-velocity drive system according to claim 5, wherein each pin assembly is configured for pivotally engaging one of the first, middle, and second rings.

7. The constant-velocity drive system according to claim 5, wherein the middle ring is located between the first and second rings.

8. A constant-velocity drive system for an aircraft rotor, the rotor being configured for rotation with a rotor mast, the constant-velocity drive system comprising:
a gimbal mechanism having gimbals adapted to be driven in rotation by a rotor mast about a mast axis, the gimbals providing for gimballing relative to the mast about gimbal axes generally perpendicular to the mast axis; and
a differential torque-combining mechanism connected to the gimbal mechanism and configured to be driven in rotation about the mast axis by the gimbal mechanism and being capable of gimballing relative to the mast about the gimbal axes, the differential torque-combining mechanism comprising:
a first ring connected to a first gimbal;
a second ring connected to a second gimbal,
a middle ring adapted to be attached to a yoke of the rotor for driving the yoke in rotation with the differential torque-combining mechanism, the a middle ring being located between the first and second rings; and
a plurality of pin assemblies connecting the first ring and second ring to the middle ring, the pin assemblies allowing for relative motion of the first and second rings while providing for transfer of forces from the first and second rings to the middle ring.

9. The constant-velocity drive system according to claim 8, wherein each pin assembly is configured for pivotally engaging one of the first and second rings or the middle ring.

* * * * *